US008908944B2

(12) United States Patent
Ishikawa et al.

(10) Patent No.: US 8,908,944 B2
(45) Date of Patent: Dec. 9, 2014

(54) INFORMATION PROCESSING APPARATUS, INFORMATION PROCESSING METHOD, AND PROGRAM

(75) Inventors: Ryo Ishikawa, Kawasaki (JP); Kiyohide Satoh, Kawasaki (JP); Takaaki Endo, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 89 days.

(21) Appl. No.: 13/502,981

(22) PCT Filed: Oct. 18, 2010

(86) PCT No.: PCT/JP2010/068773
§ 371 (c)(1), (2), (4) Date: Apr. 19, 2012

(87) PCT Pub. No.: WO2011/052515
PCT Pub. Date: May 5, 2011

(65) Prior Publication Data
US 2012/0207368 A1    Aug. 16, 2012

(30) Foreign Application Priority Data

Oct. 27, 2009    (JP) .................................. 2009-246667

(51) Int. Cl.
G06K 9/00    (2006.01)
G06T 7/00    (2006.01)

(52) U.S. Cl.
CPC ..... *G06T 7/0032* (2013.01); *G06T 2207/10132* (2013.01); *G06T 2207/10072* (2013.01); *G06T 2207/30068* (2013.01)
USPC ....................................................... 382/128

(58) Field of Classification Search
None
See application file for complete search history.

(56) References Cited

U.S. PATENT DOCUMENTS

| 6,104,833 A * | 8/2000 | Naoi et al. ..................... 382/190 |
| 6,650,778 B1 * | 11/2003 | Matsugu et al. .............. 382/209 |
| 7,817,844 B2 * | 10/2010 | Kitamura et al. ............. 382/141 |
| 7,925,048 B2 * | 4/2011 | Kinoshita ..................... 382/103 |
| 8,005,279 B2 * | 8/2011 | Yagi et al. .................... 382/128 |
| 8,504,339 B2 * | 8/2013 | Narayana ......................... 703/8 |
| 2005/0259882 A1 * | 11/2005 | Dewaele ....................... 382/243 |

(Continued)

FOREIGN PATENT DOCUMENTS

| CN | 101038623 A | 9/2007 |
| CN | 101251897 A | 8/2008 |

(Continued)

OTHER PUBLICATIONS

Carter et al., "Biomechanical Model Initialized Non-Rigid Registration for Image-Guided Breast Surgery," 9th Computational Biomechanics for Medicine, 9th MICCAI Conference workshop, pp. 104-112.

(Continued)

*Primary Examiner* — Nancy Bitar
(74) *Attorney, Agent, or Firm* — Canon USA Inc. IP Division

(57) ABSTRACT

An information processing apparatus for deforming an original image includes an obtaining unit configured to obtain a deformation rule by associating a movement of a feature area caused by deformation of the original image with the deformation, and a deformation unit configured to deform the original image in accordance with the deformation rule, using, as a condition of constraint, position information about a feature area of the target image and a corresponding area of the original image.

8 Claims, 12 Drawing Sheets

(56) References Cited

U.S. PATENT DOCUMENTS

| | | | |
|---|---|---|---|
| 2007/0014457 A1* | 1/2007 | Jolly et al. | 382/128 |
| 2008/0143724 A1* | 6/2008 | Russakoff | 345/441 |
| 2008/0199044 A1* | 8/2008 | Tsurumi | 382/103 |
| 2011/0142308 A1* | 6/2011 | Ishikawa et al. | 382/128 |

FOREIGN PATENT DOCUMENTS

| | | |
|---|---|---|
| JP | 2005521502 A | 7/2005 |
| JP | 2006102091 A | 4/2006 |
| JP | 2007319676 A | 12/2007 |
| JP | 200886400 A | 4/2008 |
| JP | 2008165773 A | 7/2008 |
| JP | 2009160314 A | 7/2009 |
| JP | 2010119654 A | 6/2010 |
| WO | 03083779 A2 | 10/2003 |

OTHER PUBLICATIONS

Hu et al., "A Statistical Motion Model Based on Biomechanical Simulations," MICCAI 2008, Part I, LNCS 5241, 2008, pp. 737-744.

* cited by examiner

INFORMATION PROCESSING APPARATUS, INFORMATION PROCESSING METHOD, AND PROGRAM

TECHNICAL FIELD

The present invention relates to an apparatus for processing medical images captured using various types of apparatuses for medical image collection (modality) such as an X-ray compute tomography (X-ray CT) apparatus, a magnetic resonance imaging (MRI) apparatus, a nuclear medicine diagnosis apparatus (single photon emission computed tomography (SPECT), positron emission tomography (PET)), and an ultrasound diagnostic imaging apparatus.

BACKGROUND ART

In a medical field, doctors display medical images of patients on monitors and interpret (read) the displayed medical images to observe the state of lesions or the change of the lesions over time. Examples of apparatuses configured to generate such medical images include simple X-ray imaging apparatuses, X-ray compute tomography (X-ray CT) apparatuses, magnetic resonance imaging (MRI) apparatuses, nuclear medicine diagnosis apparatuses (such as SPECT and PET), and ultrasound diagnostic imaging apparatuses (ultrasonography (US)).

For example, in the mammary gland, diagnostic imaging may be performed through the procedure of identifying the position of a breast lesion on an image captured with MRI and then observing the state of the lesion using an ultrasound diagnostic imaging apparatus. Here, in a typical radiographic protocol in the mammary gland, generally, MRI is performed in a prone position (the position of the body lying face down), and ultrasound imaging is performed in a supine position (the position of the body lying face up). A doctor performs ultrasound imaging of the lesion after estimating the position of a lesion in the supine position from the position of the lesion obtained from an MRI image in the prone position while taking into account the deformation of the breast caused by the difference in the position of the body during the imaging.

However, the deformation of the breast caused by the difference in the position of the body during the imaging may be large so that the position of the lesion estimated by the doctor may be deviated from the actual location. Therefore, the extraction of an ultrasound image of the lesion the doctor wishes to observe may fail, or a long time may be required to find the lesion. This difficulty may be overcome by performing MRI in the supine position which is the same as the position of the body during ultrasound imaging. However, imaging in the supine position may be affected by the breathing of the subject being examined, and another difficulty may arise in that a sharp MRI image necessary for interpretation will not be obtained.

If an MRI image obtained by imaging in the prone position is deformed through image processing and a virtual MRI image which is obtained by imaging in the supine position is successfully generated, the position of the lesion is identified from the deformed MRI image, and therefore ultrasound imaging of the lesion can be realized without attention paid to the difference in the position of the body during the imaging. For example, after an MRI image obtained by imaging in the prone position is interpreted and the position of the lesion on the image is obtained, the position of the lesion on a virtual MRI image in the supine position can be calculated based on information regarding posture change from the prone position to the supine position. Alternatively, the generated virtual MRI image in the supine position may be interpreted and therefore the position of the lesion on this image can directly be determined.

To achieve this, with the use of a method disclosed in NPL 1, an MRI image in the prone position can be deformed to have the same shape as an MRI image in the supine position. In the disclosed method, first, a virtual MRI image in the supine position is generated from an MRI image in the prone position using a physical simulation. Then, deformation registration between the virtual MRI image in the supine position and an actual MRI image obtained by imaging in the supine position is executed based on the similarity of pixel values. Based on the correspondences obtained in the above process, the process of deforming the MRI image in the prone position to have the same shape as an MRI image in the supine position is executed.

NPL 2 discloses a technique for obtaining a statistical motion model (SMM) by obtaining in advance, using a physical simulation, a deformed shape group for various settings of a parameter regarding the deformation (hereinafter referred to as a deformation parameter) of a target object and by applying principal component analysis to the result. NPL 2 also discloses a technique for associating shapes acquired before and after deformation by comparing shape data acquired after deformation, which is obtained separately, with the shape of the surface portion of the SMM and by estimating deformation.

In order to correctly perform the process using the method described in NPL 1, it is necessary to obtain in advance an accurate value of the deformation parameter of the target object. That is, if the deformation parameter is not obtained, it is difficult to apply the method described in NPL 1. When the deformation parameter is unknown, an approach of attempts to apply a deformation based on all the patterns of the change of the deformation parameter may be conceivable. However, many attempts of deformation may require a large amount of time.

In the method described in NPL 2, deformation is estimated only using the outline shape of the target object, leading to ambiguous estimation of deformation on a smooth curve such as the surface of the human breast. Thus, high-accuracy estimation of deformation may not be feasible.

CITATION LIST

Non Patent Literature

NPL 1 T. J. Carter, C. Tanner, W. R. Crum, and D. J. Hawkes, "Biomechanical model initialized non-rigid registration for image-guided breast surgery," 9th Computational Biomechanics for Medicine, 9th MICCAI Conference workshop NPL 2 Y. Hu, D. Morgan, H. U. Ahmed, D. Pendse, M. Sahu, C. Allen, M. Emberton, and D. Hawkes, "A Statistical Motion Model Based on Biomechanical Simulations," MICCAI 2008, Part I, LNCS 5241, pp. 737-744, 2008

SUMMARY OF INVENTION

The present invention provides a mechanism for the high-accuracy and high-speed estimation of deformation caused by the difference in deformation condition when the deformation parameter of the target object is unknown.

An aspect of the present invention provides an information processing apparatus for executing a process for deforming a shape of an original image so as to approximate a shape of a target image, including an obtaining unit configured to obtain a deformation rule by associating a movement of a feature area caused by deformation of the original image with the deformation; and a deformation unit configured to deform the original image in accordance with the deformation rule, using, as a condition of constraint, position information about a feature area of the target image and a corresponding area of the original image.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention, and together with the description, serve to explain the principles of the invention.

DESCRIPTION OF EMBODIMENTS

An information processing apparatus and method according to exemplary embodiments of the present invention will be described in detail in accordance with the accompanying drawings. It is to be understood that the scope of the invention is not limited to the examples illustrated in the figures.

First Embodiment

Figure 1:
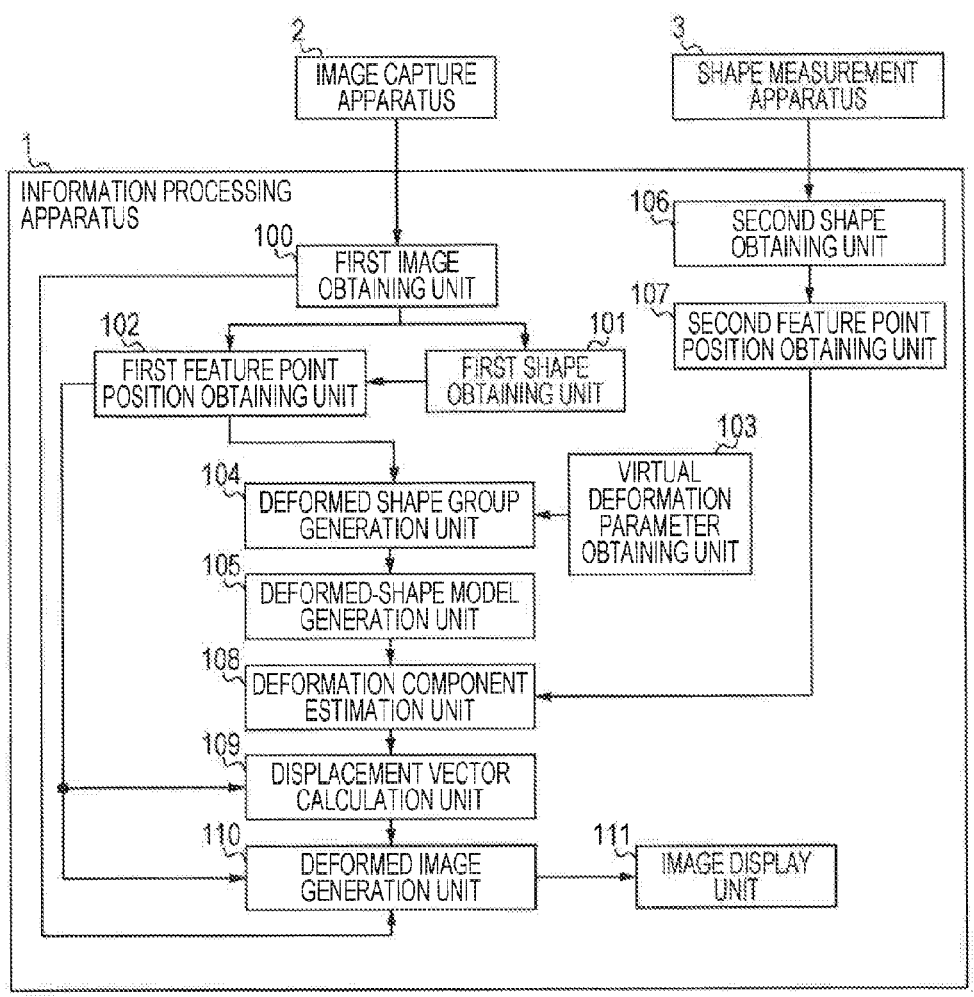
FIG. 1 is a diagram illustrating a functional configuration of an information processing apparatus according to a first embodiment.

FIG. 1 illustrates a functional configuration of an information processing apparatus 1 according to a first embodiment of the present invention. The information processing apparatus 1 according to this embodiment is connected to an MRI apparatus serving as an image capture apparatus 2 and a laser range sensor serving as a shape measurement apparatus 3. The information processing apparatus 1 obtains first three-dimensional image data (original image data) obtained by capturing an image of a target object under a first deformation condition using the image capture apparatus 2. The information processing apparatus 1 further obtains a surface shape of the target object obtained by measuring the target object under a second deformation condition using the shape measurement apparatus 3, as a shape of the target image (hereinafter referred to as a second surface shape).

Based on the obtained information, a deformed image obtained by deforming a first three-dimensional image is generated and displayed so that the shape of the target object appearing in the first three-dimensional image (hereinafter referred to as a first shape) substantially match the shape of the target object under the second deformation condition (hereinafter referred to as a second shape).

The information processing apparatus 1 includes the following functions.

A first image obtaining unit 100 obtains a first three-dimensional image (original image) produced by capturing the target object under the first deformation condition using the image capture apparatus 2, and transmits the first three-dimensional image to a first shape obtaining unit 101, a first feature point position obtaining unit 102, and a deformed image generation unit 110.

The first shape obtaining unit 101 processes the first three-dimensional image obtained by the first image obtaining unit 100 to extract information regarding the shape (first shape) of the target object under the first deformation condition, and generates a shape model (hereinafter referred to as a first shape model) describing the first shape. Then, the generated first shape model is transmitted to the first feature point position obtaining unit 102.

The first feature point position obtaining unit 102 processes the first three-dimensional image obtained by the first image obtaining unit 100, and extracts a predetermined feature area of the target object under the first deformation condition. Then, the first feature point position obtaining unit 102 performs a process for incorporating information regarding the position of the feature area (hereinafter referred to as the position of the first feature area) into the first shape model. Then, the first shape model including the information regarding the feature area is transmitted to a deformed shape group generation unit 104, a displacement vector calculation unit 109, and the deformed image generation unit 110.

A virtual deformation parameter obtaining unit 103 obtains $n_p$ sets of virtual deformation parameters in which values that can be taken by a deformation parameter of the target object are set in a virtual manner, using a method described below, and transmits the $n_p$ sets of virtual deformation parameters to the deformed shape group generation unit 104. Examples of the deformation parameter of the target object include material-mechanical physical quantities (such as the elastic modulus) for defining the characteristics relating to the deformation of the target object, and information regarding external force exerted on the target object under the first and second deformation conditions.

The deformed shape group generation unit 104 performs a physical simulation on the first shape model on the basis of each of the plurality of virtual deformation parameters received from the virtual deformation parameter obtaining unit 103. Thus, the deformed shape group generation unit 104 generates a plurality of deformed shapes (hereinafter referred to as a deformed shape group) in which the first shape is deformed, and calculates a displacement of the position of the feature area. Then, the above information is transmitted to a deformed-shape model generation unit 105.

The deformed-shape model generation unit 105 generates, based on the deformed shape group, a deformed-shape model that can provide the approximate representation of the positional displacement of various deformed shapes that can be taken by the target object under the second deformation condition and the feature area, and transmits the deformed-shape model to a deformation component estimation unit 108.

A second shape obtaining unit 106 obtains a surface shape (second surface shape) of the target object under the second deformation condition from the shape measurement apparatus 3. In this embodiment, range data including the set of three-dimensional coordinates representing the position of a point group closely arranged on the surface of the object may be supplied as the surface shape of the target object from the shape measurement apparatus 3.

A second feature point position obtaining unit 107 extracts, based on the second surface shape (range data) obtained by the second shape obtaining unit 106, the position of the feature area of the target object (the position of a second feature area), and transmits the position of the second feature area to the deformation component estimation unit 108.

The deformation component estimation unit 108 calculates, based on the position of the second feature area extracted by the second feature point position obtaining unit 107, a deformation component estimated value for describing the second shape using the deformed-shape model. The calculated estimated value is then transmitted to a displacement vector calculation unit 109.

The displacement vector calculation unit 109 calculates, based on the deformation component estimated value, a displacement vector for deforming the first shape model to match the second shape, and transmits the displacement vector to the deformed image generation unit 110.

The deformed image generation unit 110 generates, based on the first shape model and the displacement vector, a second three-dimensional image (deformed image) in which the first three-dimensional image is deformed to match the second shape, and transmits the second three-dimensional image to an image display unit 111.

The image display unit 111 displays the second three-dimensional image.

Figure 2:
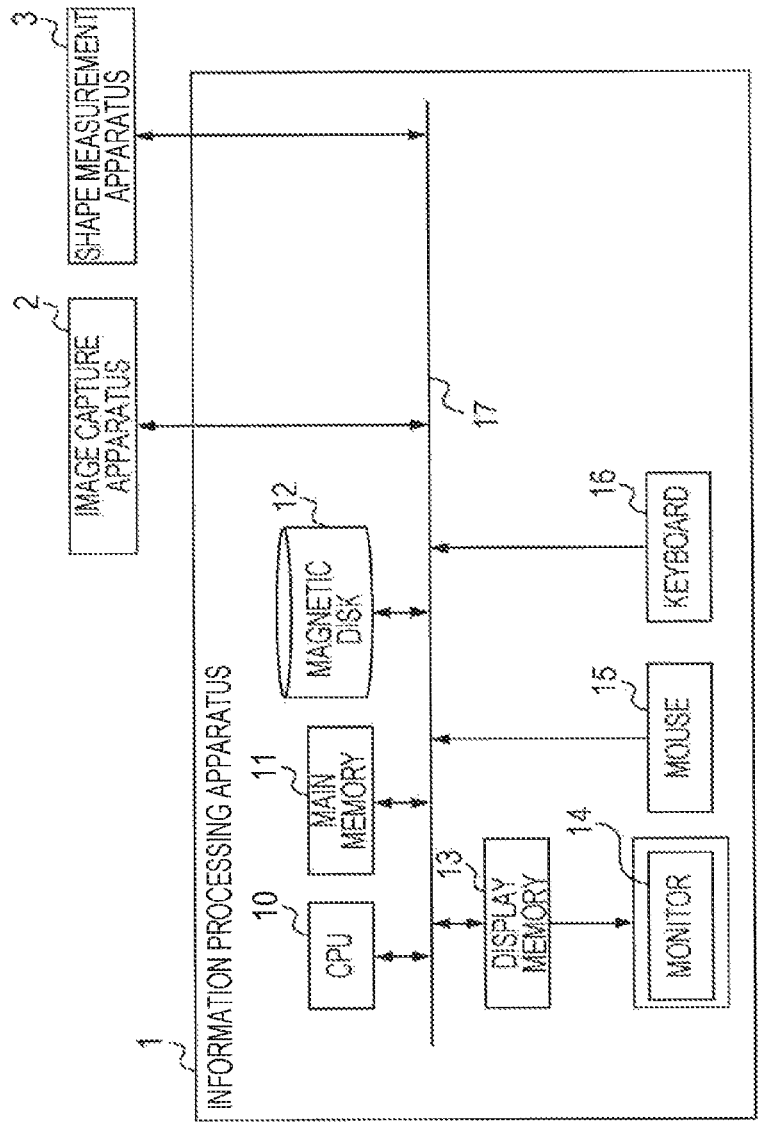
FIG. 2 is a diagram illustrating a device configuration of the information processing apparatus according to the first embodiment.

FIG. 2 is a diagram illustrating the configuration of an information processing apparatus according to the first embodiment and apparatuses connected to the information processing apparatus. The information processing apparatus 1 may be implemented by, for example, a personal computer (PC), and includes a central processing unit (CPU) 10, a main memory 11, a magnetic disk 12, a display memory 13, a monitor 14, a mouse 15, and a keyboard 16.

The CPU 10 mainly controls the operation of each element of the information processing apparatus 1. The main memory 11 stores a control program executed by the CPU 10, or provides a work area when the CPU 10 executes a program. The magnetic disk 12 stores various software applications including an operating system (OS), device drivers of peripheral devices, and programs for performing a deformation estimation process described below and other suitable processes. The display memory 13 temporarily stores display data for the monitor 14. The monitor 14 may be, for example, a cathode ray tube (CRT) monitor, a liquid crystal display monitor, or the like, and displays an image based on data from the display memory 13. The mouse 15 and the keyboard 16 allow a user to perform pointing input and to input text and the like. The above elements are connected to one another via a common bus 17 so as to communicate with one another.

The information processing apparatus 1 is connected to the shape measurement apparatus 3 via a local area network (LAN) such as Ethernet (registered trademark), and can obtain the surface shape of the target object from the shape measurement apparatus 3. The information processing apparatus 1 is also connected to the image capture apparatus 2 via a LAN such as Ethernet (registered trademark), and can obtain image data from the image capture apparatus 2. Embodiments of the present invention are not limited to this configuration, and the information processing apparatus 1 may be connected to the shape measurement apparatus 3 and the image capture apparatus 2 via any other interface such as a universal serial bus (USB) interface or an Institute of Electrical and Electronic Engineers (IEEE) 1394 interface. The information processing apparatus 1 may also be configured to load necessary data via a LAN or the like from a data server that manages the above data. Alternatively, the information processing apparatus 1 may be connected to a storage device such as a flexible disk drive (FDD), a compact disc rewritable (CD-RW) drive, a magneto-optical (MO) drive, or a Zip drive, and may load necessary data therefrom.

The information processing apparatus 1 according to this embodiment estimates deformation from the shape of the target object under the first deformation condition to the shape of the target object under the second deformation condition, deforms the first three-dimensional image accordingly, and displays the deformed three-dimensional image. That is, a deformation process is performed on the first three-dimensional image, and a virtual three-dimensional image under the second deformation condition is generated and is displayed.

In this embodiment, by way of example, the human breast is used as the target object. In this embodiment, the first deformation condition may be a state where the patient's breast faces down in the direction of gravitational force (prone position). The second deformation condition may be a state where the patient's breast faces up in the direction of gravitational force (supine position). That is, the directions of the gravitational force on the breast under the first deformation condition and the second deformation condition are different. Due to the difference between the conditions, deformation occurs between the first shape and the second shape. The information processing apparatus 1 according to this embodiment executes deformation registration using, as unknown deformation parameters, the different directions of gravitational force on the target object under the first deformation condition and the second deformation condition and the elastic modulus of the target object (Young's modulus, Poisson's ratio).

Figure 3:
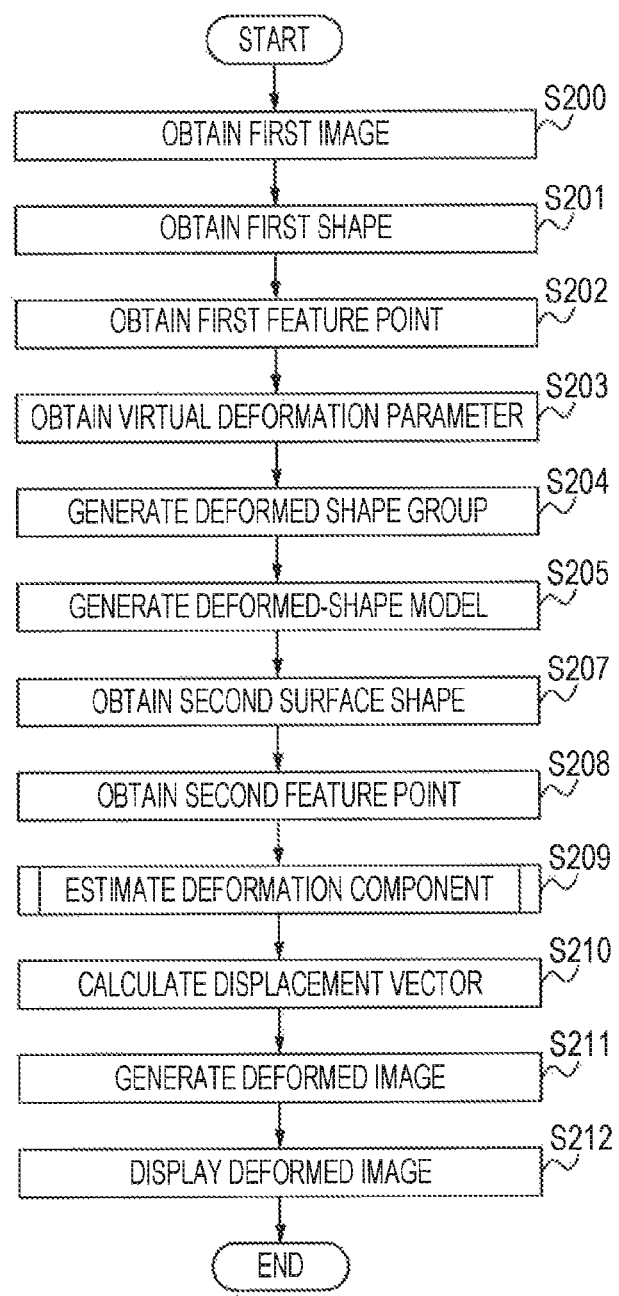
FIG. 3 is a flowchart illustrating a processing procedure of the information processing apparatus according to the first embodiment.

Next, the process executed by the information processing apparatus 1 according to this embodiment will be described in detail with reference to a flowchart illustrated in FIG. 3.

Figure 4A:
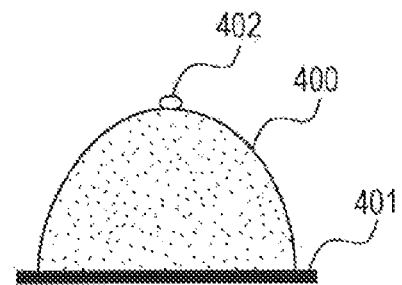
FIGS. 4A to 4D are diagrams illustrating a target object and the acquisition of the shape of the target object according to the first embodiment.

The processing of each step will be described in the context of, as illustrated in FIG. 4A, the capture of the image of a breast 400 connected to a chest wall surface 401 which is not deformed, by way of example. It is to be noted that a nipple 402 is located on the top of the breast 400 and is connected to the breast 400. In FIG. 4A, for convenience of illustration, the breast 400, the chest wall surface 401, and the nipple 402 are illustrated as a two-dimensional planar object. However, in this embodiment, these have a three-dimensional shape, and the cross-section thereof is illustrated in FIG. 4A.

In this embodiment, Young's modulus and Poisson's ratio may be scalar quantities, and are represented by $p_y$ and $p_p$, respectively. Further, the difference in gravitational acceleration is a three-dimensional vector quantity $p_g$ of the gravitational acceleration on the breast 400, and the components of the vector quantity $p_g$ are represented by $p_{gx}$, $p_{gy}$, and $p_{gz}$. That is, the deformation parameter p of the breast 400 in this embodiment is represented by the fifth-dimensional vector given in Math. 1.

$$p(p_y, p_p, p_{gx}, p_{gy}, p_{gz})^T \qquad \text{[Math. 1]}$$

Figure 5:
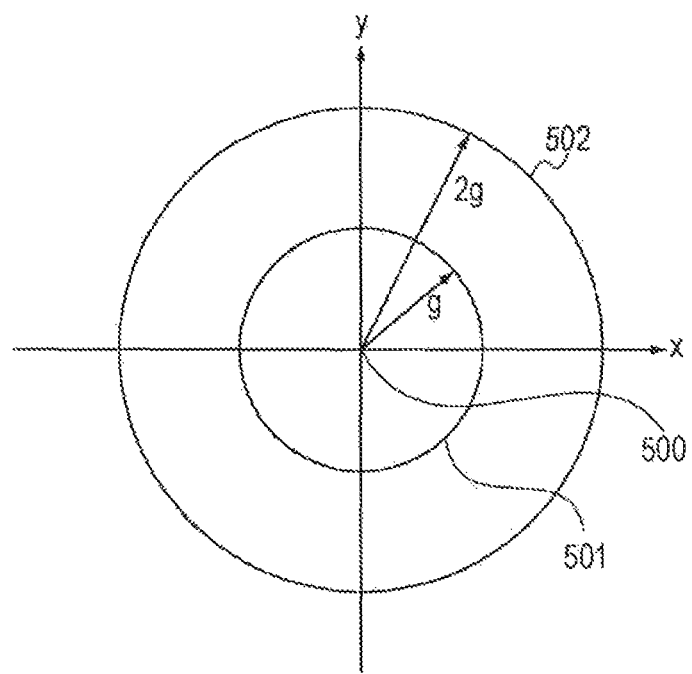
FIG. 5 is a diagram illustrating gravitational acceleration according to the first embodiment.

Here, to help understand the following description, the meaning of the difference in gravitational acceleration $p_g$ will be described in detail with reference to FIG. 5. FIG. 5 is a vector diagram illustrating the vector of force imposed on an arbitrary local area of the target object due to the gravitational acceleration. Here, for convenience of illustration, the description will be given using a two-dimensional vector diagram. However, in this embodiment, since $p_g$ is a three-dimensional vector, the description with reference to FIG. 5 may be extensively used for the three-dimensional application.

In FIG. 5, a first gravitational condition 500 represents the vector of the gravitational acceleration exerted on the target object under the first deformation condition. In FIG. 5, the first gravitational condition 500 is plotted at the origin of the vector diagram, and a non-gravitational condition 501 and a second gravitational condition 502 described below are represented as relative vectors to the first gravitational condition 500.

The non-gravitational condition 501 represents a value that can be taken by the vector of gravitational acceleration in a non-gravitational state if the first gravitational condition 500 is used as a reference. Here, the absolute value of the gravitational acceleration vector of the non-gravitational condition 501 is uniquely determined as the magnitude of gravitational acceleration on the Earth. Here, the absolute value is represented by g. However, the direction of the vector is not determined. Therefore, the value that can be taken by the vector of the force in the non-gravitational state in FIG. 5 may be any point on the circumference of a circle with radius g centered at the first gravitational condition 500.

The second gravitational condition 502 represents a value that can be taken by the gravitational acceleration vector applied to the target object under the second deformation condition. The absolute value of the gravitational acceleration vector applied to the target object under the second deformation condition is also represented by g if the non-gravitational state is used as a reference. However, the direction of the vector is not determined. Therefore, in the representation of a vector diagram using the non-gravitational state as a reference, any vector on a circle having radius g with the non-gravitational state as the origin can be taken. On the other hand, if, as illustrated in FIG. 5, the first gravitational condition 500 is used as a reference, the gravitational acceleration vector applied to the target object under the second deformation condition can take a vector on the circumference of a circle with radius g centered at an arbitrary point on the circumference of the non-gravitational condition 501. Therefore, in FIG. 5, the second gravitational condition 502 can take any vector in a circle with radius $2g$ centered at the first gravitational condition 500. Therefore, the three-dimensional vector quantity $p_g$ regarding external force in this embodiment can take an arbitrary three-dimensional vector quantity having an absolute value of 2 g or less.

Step S200

Figure 4B:
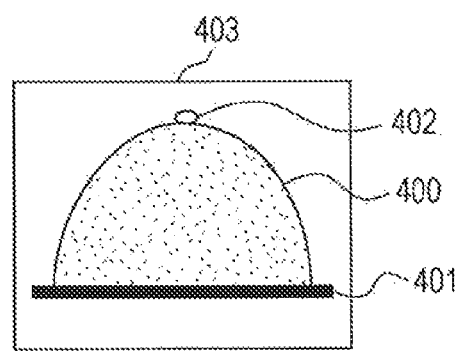

In step S200, the first image obtaining unit 100 obtains, as a first three-dimensional image (original image), an MRI image of the breast 400 that is captured by the image capture apparatus 2 under the first deformation condition. Here, FIG. 4B illustrates an example of the first three-dimensional image obtained by the first image obtaining unit 100. The information of the first three-dimensional image ($I_1$) 403 may be described by Math. 2 as a function of brightness of a captured image defined in a three-dimensional space within the capture range.

$$I_1(x,y,z) \qquad \text{[Math. 2]}$$

where x, y, and z mean position coordinates in a three-dimensional space within the capture range, and denote the positions translated from the origin by x mm, y mm, and z mm, respectively, in the orthogonal coordinate system using an image capture apparatus or a captured image (hereinafter referred to as an MRI coordinate system) as a reference.

Step S201

In step S201, the first shape obtaining unit 101 processes the first image 403 obtained in step S200 to generate a first shape model representing the shape of the breast 400 under the first deformation condition. This process will be described in detail with reference to FIGS. 4A to 4D.

Figure 4C:
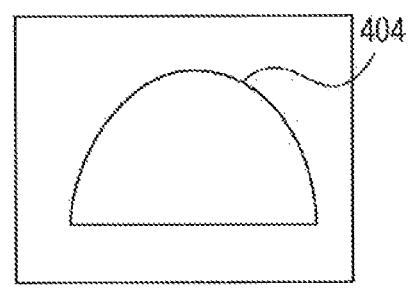

First, the first shape obtaining unit 101 performs an outline extraction process on the first three-dimensional image 403 (FIG. 4B) to obtain an outline shape 404 illustrated in FIG. 4C. The outline extraction process may be a process for determining an outline that is the boundary between inside and outside of the breast 400 in the first three-dimensional image 403. In a specific example of this process, the space gradient of the brightness value of the first three-dimensional image 403 may be calculated, and the outline shape 404 may be determined using a method such as performing threshold processing. Alternatively, image area segmentation may be performed based on the histogram of brightness values or the difference in pattern (texture) of brightness values inside and outside the breast 400 in the first three-dimensional image 403, and the boundary of the area may be determined as the outline shape 404. The process for determining the outline shape 404 may be executed using any of the above methods or a combination thereof, or using any other method.

Figure 4D:
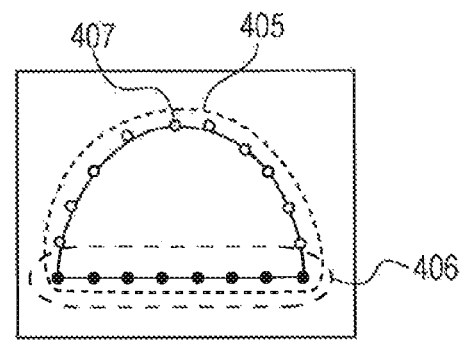

Then, the first shape obtaining unit 101 divides the outline shape 404 into sections at an appropriate interval, and arranges an outline node group 405 illustrated in FIG. 4D. The outline node group 405 includes outline nodes each having information about the three-dimensional position coordinates. Here, it is assumed that the outline node group 405 is composed of $m_1'$ outline nodes, and the position coordinates of each outline node is represented by a three-dimensional position coordinate vector $s_{1i}$ ($1 \leq i \leq m_1'$).

Then, the first shape obtaining unit 101 sets a node group in the outline node group 405, which corresponds to a position at which the breast 400 adjoins the chest wall surface 401, as a fixed node group 406. For example, the area of the chest wall surface 401 may be detected and recognized using the area segmentation process, and a continuous node group among nodes near the area (nodes whose distance from the area is within a predetermined threshold) may be determined as the fixed node group 406. Then, necessary information is recorded so that the fixed node group 406 and the other node group (hereinafter referred to as a surface node group) can be distinguished from each other.

Figure 6:
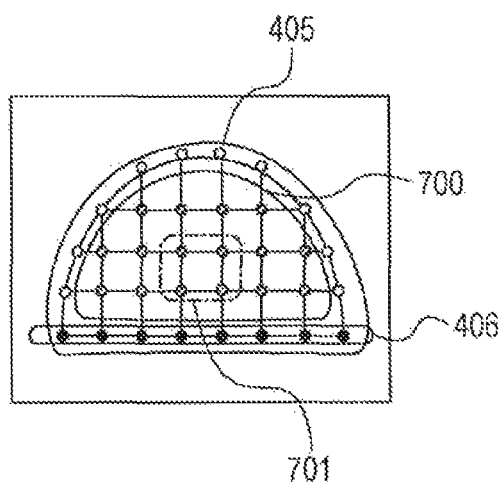
FIG. 6 is a diagram illustrating a mesh model according to the first embodiment.

Then, the first shape obtaining unit 101 generates the first shape model using the information regarding the outline node group 405 obtained in the above process. In this embodiment, the first shape model is represented using a mesh model described below. A mesh model generation process performed by the first shape obtaining unit 101 will be described with reference to FIG. 6. In FIG. 6, the outline node group 405 and the fixed node group 406 are identical to those described with reference to FIG. 4D. First, the first shape obtaining unit 101 generates an internal node group 700 in an area surrounded by the outline node group 405. In this case, the internal node group 700 may be arranged in such a manner that the area surrounded by the outline node group 405 is divided into portions at, for example, equal intervals. However, in an embodiment of the present invention, the internal node group 700 may be arranged using any method. Further, the first shape obtaining unit 101 generates information regarding the connection of the outline node group 405 and the fixed node group 406. The generation of information regarding the connection of node groups may be implemented using a method such as applying Delaunay segmentation to the node groups. Data representing information regarding the connection of the outline node group and internal node group generated in the above process is hereinafter referred to as a mesh model. Further, a model in which each of the nodes constituting the mesh model is assigned position information about the node obtained above (that is, the mesh model configured to represent the shape of the breast 400 under the first deformation condition) is hereinafter referred to as a first shape model. In the following description, the position coordinates of each node in the generated internal node group 700 are represented by a three-dimensional position coordinate vector $s_{1i}$ ($m_1'+1 \leq i \leq m_1$) ($m_1$ denotes the total number of nodes of the mesh model). Then, as given in Math. 3, the position information of the node group constituting the first shape model is represented by a $(3 \times m_1)$-th dimensional vector $s_1$ in which the position coordinates of all the nodes including the outline node group 405 and the internal node group 700 are arranged vertically.

$$s_1 = \left( s_{11}^T s_{12}^T \ldots s_{1m_1}^T \right)^T = \begin{pmatrix} x_{11} \\ y_{11} \\ z_{11} \\ \vdots \\ z_{1m_1} \end{pmatrix} \quad [\text{Math. 3}]$$

The first shape model generated in the above process may be transmitted to each unit and may be used in the subsequent processing.
Step S202

In step S202, the first feature point position obtaining unit 102 processes the first image 403 obtained in step S200, and extracts a predetermined feature area located on the surface of the breast 400. The feature area may be located at, for example, the position of the nipple 402. Further, when the first image 403 is captured, a plurality of markers (not illustrated in FIGS. 4A to 4D) that can be captured with MRI may be attached to the surface of the subject being examined, and may be used as feature areas. In the following description, the number of feature areas obtained by the above process is represented by $n_f$. Further, a coordinate value representing the position of the feature areas is represented by $v_{1j} = (x_{1j}, y_{1j}, z_{1j})$ ($1 \leq j \leq n_f$), and is hereinafter referred to as the position of the first feature area.

In step S202, furthermore, the first feature point position obtaining unit 102 executes a process for incorporating the information regarding the position of the first feature area obtained in the above process into the first shape model. Specifically, the first feature point position obtaining unit 102 searches each of the first feature areas for a node whose position is the closest to the position $v_{1j}$ of the feature area among the surface node group constituting the first shape model, and sets the found node as a node representing the feature area (hereinafter referred to as a feature area node). That is, as the feature area node representing the j-th feature area, an index $n_j$ ($1 \leq j \leq n_f$) of the node is recorded, and the position $s_{1nj}$ thereof is replaced by $v_{1j}$. That is, the relationship given in Math. 4 is obtained.

$$s_{1nj} = v_{1j} \quad [\text{Math. 4}]$$

For example, when the nipple 402 illustrated in FIG. 4B is extracted, a node that is the closest to the position of the nipple 402 is set as a nipple node 407 (FIG. 4D). Then, position information about the nipple node 407 is replaced by the position of the nipple 402 extracted in step S202. In this embodiment, three or more feature areas are extracted, by way of example. That is, the case of $n_f \geq 3$ will be described.
Step S203

In step S203, the virtual deformation parameter obtaining unit 103 obtains a plurality of virtual deformation parameters that is a virtual combination of values that can be taken by the deformation parameter. In this embodiment, $n_p$ virtual deformation parameters $p_k$ ($1 \leq k \leq n_p$) are obtained, by way of example.

The virtual deformation parameters $p_k$ are generated by dividing the range that can be taken by each component value of the deformation parameter at appropriate intervals and obtaining all the combinations. In this case, the level of division may be changed in accordance with the level of the influence of each component on the deformation of the target object. For example, among the virtual deformation parameters $p_k$, the ranges that can be taken for $p_y$ and $p_p$ may be $1000 < p_y < 4000$ [kPa] and $0 < p_p < 0.5$, respectively, and the ranges for $p_{gx}$, $p_{gy}$, and $p_{gz}$ may be ranges satisfying $p_{gx}^2 + p_{gy}^2 + p_{gz}^2 \leq (2g)^2$. Then, for example, the range for $p_y$ may be divided into ten sections in steps of 30 [kPa] because of the large influence on the deformation, and the range for $p_p$ may be divided into five sections in steps of 0.1 because of the small influence on the deformation. Further, for each of $p_{gx}$, $p_{gy}$, and $p_{gz}$, the combination satisfying the above range among the combinations obtained by dividing the ranges of $-2$ g to $+2$ g is set.
Step S204

In step S204, the deformed shape group generation unit 104 executes a process for generating a deformed shape group in which the first shape model is deformed, based on each of the plurality of hypothetic deformation parameters (virtual deformation parameter) obtained in step S203. The process performed by the deformed shape generation unit 104 may be implemented by using, for example, a physical simulation based on the finite element method.

First, each of the virtual deformation parameters $p_k$ ($1 \leq k \leq n_p$) is assumed, and a physical simulation based on the finite element method is performed on the first shape model to calculate the displacement vector $d_{ki}$ ($1 \leq k \leq n_p$, $1 \leq i \leq m_1$) of each of the nodes constituting the mesh model. Then, the calculation given in Math. 5 is executed to perform a displacement based on the displacement vector $d_{ki}$ ($1 \leq k \leq n_p$, $1 \leq i \leq m_1$) on the position $s_{1i}$ ($1 \leq i \leq m_1$) of the nodes of the first shape model. Therefore, the position $s_{dki}$ ($1 \leq k \leq n_p$, $1 \leq i \leq m_1$) of each node after displacement is calculated.

$$s_{dki} = s_{1i} + d_{ki} \quad [\text{Math. 5}]$$

As described in the processing of step S202, the nodes constituting the mesh model include a feature area node representing a feature area. Therefore, with the above process, the position $v_{dkj}$ ($=s_{dknj}$) of each feature area after displacement when each of the virtual deformation parameters $p_k$ ($1 \leq k \leq n_p$) is assumed is also estimated.

Finally, a $(3 \times m_1)$-th dimensional vector $s_{dk}$ in which the position coordinates $s_{dki}$ ($1 \leq i \leq m_1$) of all the nodes are arranged vertically is generated for each virtual deformation parameter $p_k$ ($1 \leq k \leq n_p$). Then, the shape (that is, deformed shape) that will be obtained by deforming the first shape when the virtual deformation parameter $p_k$ is assumed is represented by the vector $s_{dk}$.

The deformed shape group generation unit 104 performs the processing of step S204 described above to generate a deformed shape group $s_{dk}$ (1≤k≤$n_p$). While this embodiment has been described in the context of an embodiment in which information regarding a deformed shape is generated using a physical simulation based on the finite element method, embodiments of the present invention are not limited to this embodiment. The deformed shape of the target object may be calculated using a physical simulation based on, for example, the difference method, the finite difference method, or the like. Alternatively, with the use of a mesh free method such as the method of particular solutions (MPS), the deformed shape can be calculated without using a mesh model. The processing of step S204 may be performed using any method other than the method described above if the deformed shape based on each of the virtual deformation parameters can be calculated.

Step S205

In step S205, the deformed-shape model generation unit 105 generates a deformed-shape model that provides the approximate representation of the deformation of the target object on the basis of the information $s_{dk}$ (1≤k≤$n_p$) regarding a plurality of deformed shapes determined in step S204.

The deformed-shape model may be generated using various methods, for example, using a statistical motion model (SMM) disclosed in NPL 2. In this method, a plurality of eigendeformation components are extracted by applying principal component analysis to the deformed shape group $s_{dk}$ (1≤k≤$n_p$), and the approximate representation of the deformation of the target object can be provided by using the linear sum of the eigendeformation components. A specific process of this method will be described.

First, an average shape $s_{d\_ave}$ is calculated using Math. 6 from the information $s_{dk}$ (1≤k≤$n_p$) regarding a plurality of deformed shapes determined in step S204.

$$s_{d\_ave} = \frac{1}{n_p} \sum_{k=1}^{np} s'_{dk}$$ [Math. 6]

Then, a normalized deformed shape group $s_{dk}'$ (1≤k≤$n_p$) is calculated by subtracting the average shape $s_{d\_ave}$ from $s_{dk}$ (1≤k≤$n_p$). Then, the variance-covariance matrix of $s_{dk}'$ (1≤k≤$n_p$) is determined, and eigenvalue decomposition of the matrix is performed to obtain an eigenvalue $\lambda_i$ (1≤i≤$n_e$) and an eigenvector $e_i$ (1≤i≤$n_e$), where $n_e$ denotes the number of eigenvectors to be calculated, and is selected so that the cumulative contribution ratio of the eigenvalues exceeds a certain threshold. The eigenvector $e_i$ is hereinafter referred to as an eigendeformation component, as necessary.

As given in Math. 7, the approximate representation of each deformed shape $s_{dk}$ (1≤k≤$n_p$) can be provided by linearly combining $s_{d\_ave}$ and $e_i$ obtained in the above process.

$$s_{dk} = s_{d\_ave} + s'_{dk} = s_{d\_ave} + \sum_{i=1}^{n_e} c_{ki} e_i$$ [Math. 7]

where $c_{ki}$ (1≤i≤$n_e$) denotes the linear combination coefficient for representing the k-th deformed shape $s_{dk}$.

The average shape $s_{d\_ave}$ and eigendeformation components $e_i$ (1≤i≤$n_e$) obtained through the above process are referred to as a deformed-shape model of the breast 400. The deformed-shape model may be used to represent the shape $s_2$ of the breast 400 under the second deformation condition by using the linear combination of $S_{d\_ave}$ and $e_i$. An arbitrary shape $s_d$ that can be taken by the breast 400 under the second deformation condition can be described by adjusting the value of the coefficient $c_i$ (1≤i≤$n_e$) given in the following equation.

$$s_d = s_{d\_ave} + \sum_{i=1}^{n_e} c_i e_i$$ [Math. 8]

As described in the processing of step S202, the nodes constituting the mesh model include a feature area node representing a feature area. Therefore, with the above linear combination, the position $v_{dj}$ (=$s_{dnj}$) that can be taken by the feature area on the breast 400 under the second deformation condition is also represented. The position coordinates of each of the nodes constituting the shape $s_d$ are hereinafter represented by $s_{di}$ (1≤i≤$n_1$), and the position coordinates of each feature area node are represented by $v_{dj}$ (1≤j≤$n_f$), if necessary.

Further, the deformation of the original image is represented by changing the position information of the nodes constituting the corresponding mesh model. Therefore, the movement of the position of the feature area is also described as a deformation rule in association with the deformation.

Step S207

In step S207, the second shape obtaining unit 106 executes a process for obtaining range data representing the surface shape (second surface shape) of the breast 400 under the second deformation condition from the shape measurement apparatus 3. The range data is composed of the set of three-dimensional coordinates representing the position of a point group closely arranged on the surface of the object, on a coordinate system (hereinafter referred to as a range sensor coordinate system) defined by the shape measurement apparatus 3.

Step S208

In step S208, the second feature point position obtaining unit 107 executes a process for obtaining the position of each feature area under the second deformation condition (the position of the second feature area) is executed for a predetermined feature area of the breast 400 whose position of the first feature area is obtained in step S202. This process is executed by, for example, extracting a part having a characteristic shape, such as a tumor, from the second surface shape obtained in step S207. The coordinate value representing the position of the second feature area is hereinafter represented by $v_{2j}=(x_{2j}, y_j, z_{2j})$ (where 1≤j≤$n_f$).

Step S209

In step S209, the deformation component estimation unit 108 estimates a set $c_i$ (1≤i≤$n_e$) of linear combination coefficients that allows the shape representation based on the deformed-shape model (that is, $s_d$ in Math. 8) to most appropriately represent the second shape $s_2$ of the breast 400. That is, estimating a set of linear combination coefficients allows the estimation of the second shape $s_2$ of the breast 400. The set of linear combination coefficients determined in step S209 is represented by an $n_e$-th dimensional vector $c_{est}$, and is hereinafter referred to as a deformation component estimated value.

Figure 7:
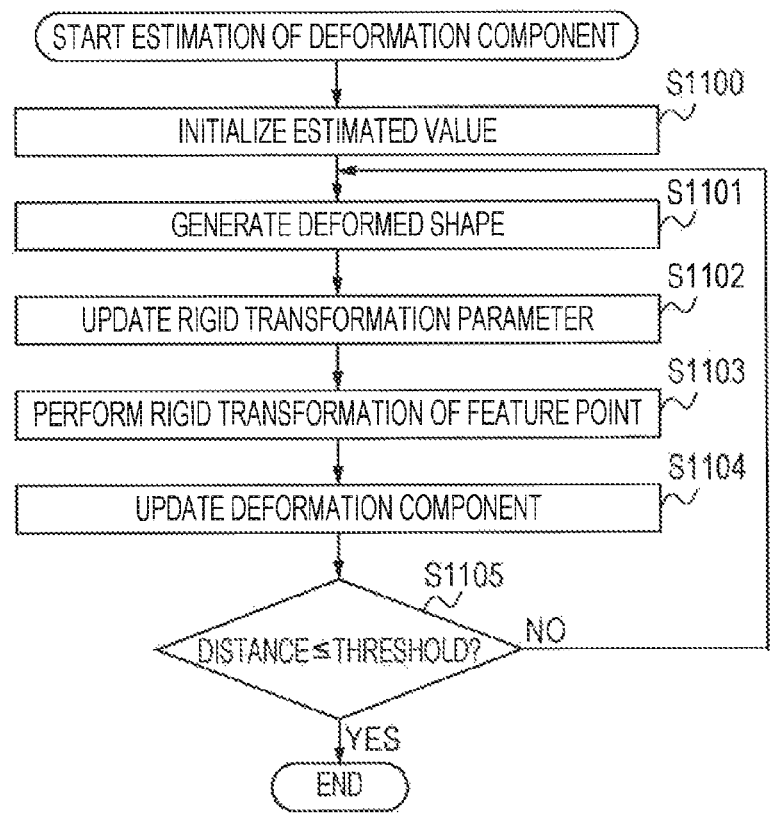
FIG. 7 is a flowchart illustrating the processing procedure of step S209 according to the first embodiment.

Specifically, the optimization of the estimated value $c_{est}$ is performed under a condition of constraint where the position of the feature area node described by the deformed-shape model generated in step S205 substantially matches the position of the second feature area obtained in step S208. A specific process of the deformation component estimation unit 108 will now be described in detail in accordance with a flowchart illustrated in FIG. 7. In the following process, the estimation of coordinate system conversion between an MRI coordinate system describing a deformed-shape model and a range sensor coordinate system describing the position of the second feature area is executed at the same time as the estimation of the value $c_{est}$. The term coordinate system conversion, as used herein, means rigid transformation represented by a 3×3 matrix R representing rotation and a three-dimensional vector t representing translation.

Step S1100

In step S1100, the deformation component estimation unit 108 initializes the deformation component estimated value $c_{est}$ and the estimated values R and t of the rigid transformation parameters. In this initialization, for example, the values $c_{est}$ and t may be set as zero vectors and R may be used as a unit matrix.

Step S1101

In step S1101, the deformation component estimation unit 108 generates an estimated deformed shape $s_{d\_est}$ by performing the calculation of Math. 9 based on the current deformation component estimated value $c_{est}$.

$$s_{d\_est} = s_{d\_ave} + \sum_{i=1}^{n_e} c_{i\_est} e_i \quad \text{[Math. 9]}$$

where $c_{i\_est}$ denotes the i-th component of the value $c_{est}$. Then, the estimated coordinate value $v_{dj\_est}$ ($1 \leq j \leq n_f$) of the j-th feature area node is obtained as the coordinates of the $n_j$-th node represented by the estimated deformed shape $S_{d\_est}$, that is, a vector including the $\{3(n_j-1)+1\}$-th, $\{3(n_j-1)+2\}$-th, and $\{3(n_j-1)+3\}$-th elements of $s_{d\_est}$, where $n_j$ denotes the index of the node assigned the j-th feature area node in the processing of step S202.

Step S1102

In step S1102, the deformation component estimation unit 108 estimates a rigid transformation parameter that allows the estimated coordinate value $v_{dj\_est}$ ($1 \leq j \leq n_f$) of the feature area node obtained in step S1101 to most match a position obtained by performing the rigid transformation of the position $v_{2j}$ ($1 \leq j \leq n_f$) of the second feature area obtained in step S208. That is, R and t that minimize the evaluation value d are calculated using, as an evaluation function, Math. 10 for determining the average value of the distance between corresponding points.

$$d = \frac{1}{n_f} \sum_{j=1}^{n_f} |v_{dj\_est} - (Rv_{2j} + t)| \quad \text{[Math. 10]}$$

The method for determining coordinate system conversion using a plurality of corresponding points is well known, and will not be described in detail herein.

Step S1103

In step S1103, the deformation component estimation unit 108 calculates a position $v_{2j\_rigid}$ ($1 \leq j \leq n_f$) obtained by performing the rigid transformation of the position $v_{2j}$ ($1 \leq j \leq n_f$) of the second feature area using the calculation given in Math. 11 on the basis of the estimated values R and t of the rigid transformation parameters obtained in step S1102.

$$v_{2j\_rigid} = Rv_{2j} + t \quad \text{[Math. 11]}$$

Step S1104

In step S1104, the deformation component estimation unit 108 updates the deformation component estimated value $c_{est}$ so as to reduce the average value (that is, the evaluation value d in Math. 10) of the distance between the position $v_{2j\_rigid}$ of the second feature area after rigid transformation obtained in step S1103 and the estimated coordinate value $v_{dj\_est}$ of the corresponding feature area node.

That is, the original image is deformed in accordance with the deformation rule using the position of the first feature area and the position of the second feature area as conditions of constraint.

The process for determining the value $c_{est}$ that minimizes the value d can be executed by solving a generally known non-linear optimization problem, and may be specifically performed using, for example, a greedy method. In this case, a new coefficient in which an element having the current value $c_{est}$ is finely increased or decreased is generated, and a deformed shape is generated using the coefficient (using Math. 9). Then, the evaluation value d in Math. 10 is calculated for the deformed shape. If the resulting value is smaller than the evaluation value d based on the original value $c_{est}$, the value of the element of the value $c_{est}$ is updated. This process is executed independently for each element of the value $c_{est}$, thus allowing the value $c_{est}$ to be updated so that the distance between the corresponding points is reduced. Further, the above process may be repeatedly executed to determine a more optimum value $c_{est}$. In addition to the above optimization method, any of generally known non-linear optimization algorithms may be used. For example, steepest descent method, Newton's method, or the like may be used.

The value $c_{est}$ is updated using the above method, and the subsequent processing is executed based on the updated value $c_{est}$.

Step S1105

In step S1105, the deformation component estimation unit 108 calculates the evaluation value d in Math. 10 on the basis of the rigid transformation parameters R and t updated in step S1102 and the deformation component estimated value $c_{est}$ updated in step S1104. Then, the process to be performed subsequently is switched based on the evaluation value d. For example, if the evaluation value d is smaller than or equal to a predetermined threshold, this process (that is, the processing of step S209) ends. Otherwise, the process returns to step S1101, and the process for updating the deformation component estimated value $c_{est}$ continues. That is, the processing of steps S1101 top S1105 is repeatedly performed while a negative result is obtained in the termination determination of step S1105.

With the processing of step S209 described above, the deformation component estimation unit 108 executes a process for calculating the deformation component estimated value $c_{est}$.

Step S210

In step S210, the displacement vector calculation unit 109 performs the calculation of Math. 9 on the basis of the value $c_{est}$ calculated in step S209, and obtains an estimated value $s_{2\_est}$ of the second shape of the breast 400. Then, a displacement vector $d_i$ ($1 \leq i \leq m_1$) for deforming each node of the first shape model to match the second shape is calculated using Math. 12.

$$d_i = s_{2i} - s_{1i} \quad \text{[Math. 12]}$$

where $s_{1i}$ denotes the three-dimensional position coordinate vector of the i-th node in the first shape model, and $s_{2i}$ denotes the three-dimensional position coordinate vector of the i-th node represented by the estimated value $s_{2\_est}$ of the second shape, which corresponds to the {3(i−1)+1}-th, {3(i−1)+2}-th, and {3(i−1)+3}-th elements of the value $s_{2\_est}$.

Step S211

In step S211, the deformed image generation unit 110 deforms the first three-dimensional image obtained in step S200 to generate a second three-dimensional image (deformed image) so that the deformed shape of the breast 400 is similar to the second shape. This deformation is executed using a known image deformation technique based on the first shape model generated in step S201 and the displacement vector $d_i$ ($1 \leq i \leq m_1$) of each node calculated in step S210.

Step S212

In step S212, the image display unit 111 displays the second three-dimensional image generated in step S211 on the monitor 14 or the like.

Here, an obtaining unit includes the first shape obtaining unit 101, the second shape obtaining unit 106, the first feature point position obtaining unit 102, the second feature point position obtaining unit 107, and the deformed-shape model generation unit 105. A deformation unit includes the deformation component estimation unit 108.

As described above, the information processing apparatus 1 according to this embodiment can generate and display a deformed image that is deformed, when the deformation parameter of the target object is unknown, so as to substantially match the shape of the target object under the second deformation condition.

MODIFICATION EXAMPLE 1-1

In this embodiment, a deformed image is generated in step S211 on the basis of the estimated value $s_{2\_set}$ of the second shape obtained in step S210. However, embodiments of the present invention are not limited to this configuration. For example, if the position $v_1$ of an area of interest (for example, the position of a tumor) inside the breast 400 is obtained in the first three-dimensional image data, the present invention may be used to estimate the position $v_2$ of the area of interest under the second deformation condition. For example, a node group surrounding the position $v_1$ of the area of interest in the first shape model may be determined, and the coordinates of the node group after displacement are obtained from the estimated value $s_{2\_est}$ of the second shape. Then, the value $v_2$ may be obtained by using the weighted average of the coordinates.

MODIFICATION EXAMPLE 1-2

In this embodiment, the processing of step S205 performed by the deformed-shape model generation unit 105 has been described in the context of an SMM-based method, by way of example. However, embodiments of the present invention are not limited to this example. For example, the normalized deformed shape group $s_{dk}'$ may be used directly as $e_i$, and subsequent processing may be executed. This method allows the generation of a deformed-shape model using simpler processing. Further, the processing of step S205 is not limited to this method, and any processing may be used if a deformed-shape model that provides the approximate representation of the deformation of the target object can be generated based on the information $s_{dk}$ ($1 \leq k \leq n_p$) regarding a plurality of deformed shapes determined in step S204.

MODIFICATION EXAMPLE 1-3

In this embodiment, a feature area of the target object has been described in the context of a characteristic area on the surface of the target object, by way of example; however, the feature area may be located inside the target object. In this case, the shape measurement apparatus 3 may be any apparatus capable of obtaining the position of the second feature area, and may be implemented by, for example, an ultrasound imaging apparatus or the like including an ultrasonic probe having a magnetic sensor or the like (not illustrated).

In this case, in the processing of step S202, the first feature point position obtaining unit 102 executes a process for extracting a feature area inside the object in addition to the process described in the foregoing embodiment. For example, an area having a feature that the brightness value of the first three-dimensional image 403 is higher than the surrounding area may be extracted, and the position of the area may be set as the position of the first feature area. A feature area node corresponding to a feature area inside the object may be selected from the internal node group 700.

Meanwhile, in the processing of step S207, the second shape obtaining unit 106 obtains the position of the tip of the probe when the operator brings the ultrasonic probe into contact with a feature area on the surface of the object, as the "position of the second feature area" of the feature area on the surface of the object. The second shape obtaining unit 106 further obtains, as information for obtaining the "position of the second feature area" of the feature area inside the object, an ultrasound image group captured by the operator by operating the ultrasonic probe in contact with the subject being examined, and the probe Position obtained when each ultrasound image is captured are obtained.

In the processing of step S208, the second feature point position obtaining unit 107 further extracts an area corresponding to the feature area inside the object obtained in step S202 from the ultrasound image group obtained in step S207. Then, the three-dimensional position of the feature area in the coordinate system used as a reference by the shape measurement apparatus 3 is calculated using the coordinates of the corresponding points of the ultrasound images and the probe position obtained when the ultrasound images are captured, and the position is set as the "position of the second feature area" of the feature area inside the object.

Furthermore, the image capture apparatus 2 may be used as the shape measurement apparatus 3. In this case, the image of the target object under the second deformation condition is captured by the image capture apparatus 2 to obtain three-dimensional image data (second three-dimensional image data). Then, the second shape obtaining unit 106 obtains the second three-dimensional image data from the image capture apparatus 2. Further, the second feature point position obtaining unit 107 obtains the position of the second feature area using a process similar to that of the first feature point position obtaining unit 102. It is to be understood that the shape measurement apparatus 3 may be implemented using another three-dimensional image capture apparatus different from the image capture apparatus 2, such as an MRI apparatus or an X-ray CT apparatus.

According to the above methods, a feature area can be obtained from a wider area. Thus, it may be expected that a larger number of feature areas can be obtained. Therefore, advantageously, higher-accuracy estimation of deformation can be achieved.

MODIFICATION EXAMPLE 1-4

In this embodiment, the position of the second feature area is obtained using the range data of the subject being examined measured by the shape measurement apparatus 3. However, embodiments of the present invention are not limited to this method if the position of the second feature area can be obtained. For example, a pen-like pointing device (stylus) capable of measuring the position of the tip using a magnetic position sensor or the like may be brought into contact with a feature area such as the nipple or a marker, and the position of the contact point may be measured directly as the position of the second feature area. In this case, the second shape obtaining unit 106 obtains the position of the second feature area measured by the shape measurement apparatus 3 in step S207, and transmits the position of the second feature area to the deformation component estimation unit 108. In this case, the function of the second feature point position obtaining unit 107 is not necessary, and the processing of step S208 is not executed.

In this embodiment, furthermore, the processing of step S202 performed by the first feature point position obtaining unit 102 has been described in the context of the determination of the position of the first feature area by processing the first three-dimensional image, by way of example. However, embodiments of the present invention are not limited to this example. For example, the position of the first feature area may be obtained in accordance with a user operation using the mouse 15, the keyboard 16, or the like. Thus, the process for extracting a feature area from the first three-dimensional image can be omitted, resulting in, advantageously, more efficient implementation of the present invention. In this case, the first feature point position obtaining unit 102 presents the first three-dimensional image to the user by displaying the first three-dimensional image on the monitor 14 or the like so that the user can set information regarding the feature area on the image while viewing the image.

Furthermore, the second feature point position obtaining unit 107 may also obtain the position of the second feature area in accordance with a user operation using the mouse 15, the keyboard 16, or the like, and advantages similar to those described above can be expected.

MODIFICATION EXAMPLE 1-5

In steps S202 and S208 in this embodiment, three or more feature areas are extracted, by way of example. However, embodiments of the present invention are not limited to this example. For example, if the coordinate systems used as a reference by the image capture apparatus 2 and the shape measurement apparatus 3 (that is, the MRI coordinate system and the range sensor coordinate system) match, two feature areas may be extracted in steps S202 and S208. In this case, the processing of steps S1102 and S1103 may be omitted, and the processing of step S1104 may be performed after the processing of step S1101. In this case, the rigid transformation parameters R and t are held at the values initialized in step S1100. Further, even when the coordinate systems used as a reference by the image capture apparatus 2 and the shape measurement apparatus 3 do not match, if the relationship between the coordinate systems is known, processing similar to that described above may be performed. In this case, in step S1100, the rigid transformation parameters R and t may be initialized based on the known relationship between the coordinate systems, and the subsequent processing may be executed using the parameters.

The above method may enable the implementation of the present invention with a smaller number of feature areas, and, advantageously, the feature area extraction process may be performed in a simple manner. Furthermore, since the rigid transformation parameters are set to known values, the process required for the estimation can be omitted, and, advantageously, the process can be simplified.

Furthermore, even when three or more feature areas are obtained in steps S202 and S208, if the coordinate systems used as a reference by the image capture apparatus 2 and the shape measurement apparatus 3 match or the relationship therebetween is known, processing similar to that described above can be executed. In this method, the rigid transformation parameters are set to known values, thus allowing the process required for the estimation to be omitted. Therefore, advantageously, the process can be simplified.

MODIFICATION EXAMPLE 1-6

The processing of step S1105 may be executed using a method other than that described above. For example, the amount of reduction of error may be determined by comparing the magnitudes of the evaluation values d obtained before and after the iterative calculation of steps S1101 to S1105, and determination based on the result may be performed. For example, if the amount of reduction is smaller than a preset threshold, the process may end, and the process may return to step S1101 otherwise. In this method, advantageously, in cases such as when the reduction of error with iterative processing is not expected, the process can be terminated. Furthermore, the number of times the iterative calculation of steps S1101 to S1105 is performed may be counted, and this iterative process may not be performed a predetermined number of times or more. In this method, advantageously, the upper limit of the calculation time required for this process can be estimated in advance. A combination of the plurality of methods described above may be used to perform determination or the combination may be specified by the user using the mouse 15, the keyboard 16, or any other suitable device.

MODIFICATION EXAMPLE 1-7

The range regarding the virtual deformation parameters, the number of divisions, etc., in the processing of step S203 are merely examples of a specific embodiment, and embodiments of the present invention are not limited to those examples. Further, the processing of step S203 may be performed using any method capable of obtaining the virtual deformation parameter $p_k$ necessary for the subsequent processing. For example, the user may input the value $p_k$ through a user interface including the mouse 15 and the keyboard 16, and the virtual deformation parameter obtaining unit 103 may obtain the input value. Alternatively, the user may input the range of each parameter, the fineness of division, or the like, and the virtual deformation parameter obtaining unit 103 may automatically generate the value $p_k$ in accordance with the instruction. In addition, information regarding the value $p_k$ may be recorded on the magnetic disk 12 or the like in advance, and the virtual deformation parameter obtaining unit 103 may obtain the recorded information.

MODIFICATION EXAMPLE 1-8

In this embodiment, an MRI apparatus is used as the image capture apparatus 2, by way of example. However, embodiments of the present invention are not limited to this example. For example, an X-ray CT apparatus, an ultrasound diagnostic imaging apparatus, a nuclear medicine apparatus, or any other suitable apparatus may be used.

Second Embodiment

The first embodiment has been described in the context of the estimation of the deformation from the first shape to the second shape using the position of corresponding feature areas as an index. A second embodiment, in contrast, will be described in the context of higher accuracy estimation of the deformation using information other than feature areas. This embodiment is configured to change a portion of the processes of the second shape obtaining unit 106 and the deformation component estimation unit 108 in the first embodiment. Other functions are similar to those in the first embodiment, and will not be described herein.

The functional configuration of an information processing apparatus according to this embodiment is similar to the functional configuration of the information processing apparatus 1 according to the first embodiment illustrated in FIG. 1. However, unlike the first embodiment, a process for transmitting information regarding the surface shape obtained by the second shape obtaining unit 106 to the deformation component estimation unit 108 is further performed. Furthermore, the deformation component estimation unit 108 performs a process for calculating, in addition to the position of the second feature area extracted by the second feature point position obtaining unit 107, a deformation component estimated value on the basis of the second surface shape obtained by the second shape obtaining unit 106.

The overall process flow of the information processing apparatus according to this embodiment is similar to the process flow according to the first embodiment described with reference to FIG. 3, and will not be described herein. However, in this embodiment, the number of feature areas (that is, $n_f$) whose position is obtained in steps S202 and S208 may be changed in accordance with the first three-dimensional image obtained in step S200 and the state of the range data obtained in step S207. In addition, the processing of step S209 performed by the deformation component estimation unit 108 is different from that in the first embodiment, and will be described in detail hereinafter.

Figure 8:
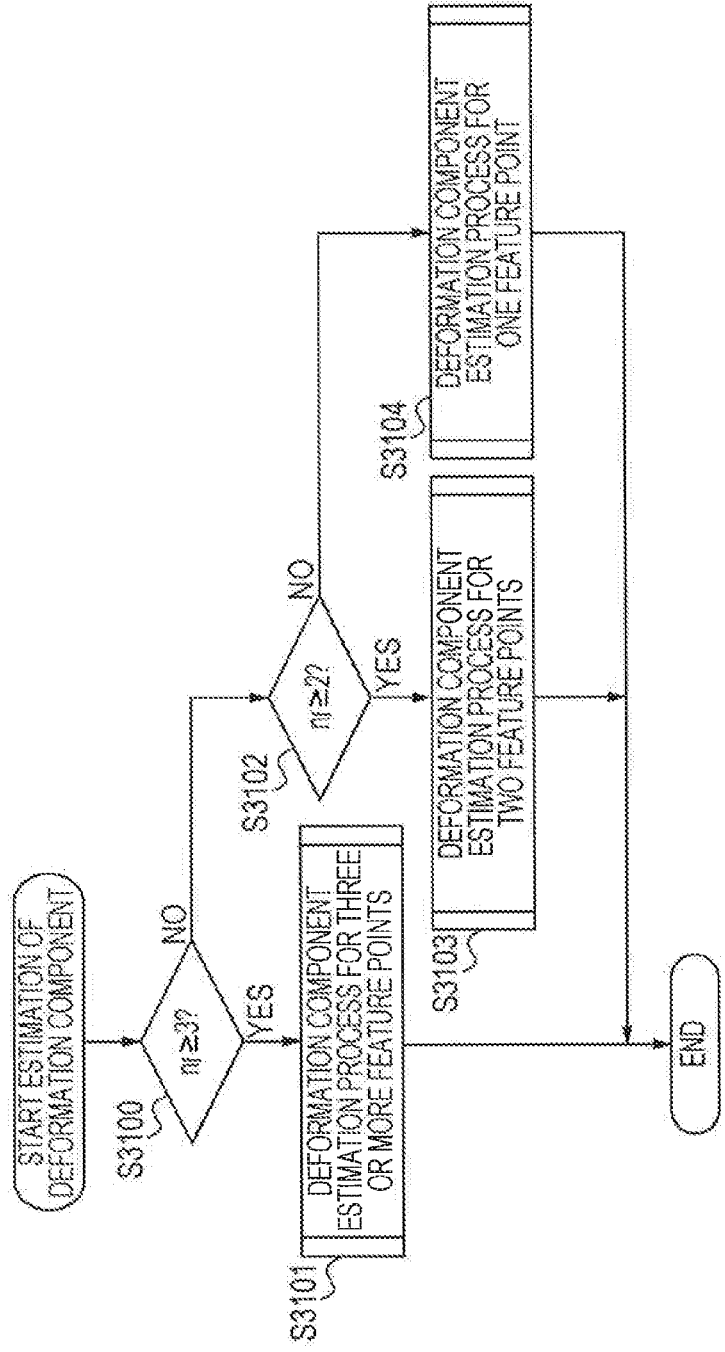
FIG. 8 is a flowchart illustrating the processing procedure of step S209 according to a second embodiment.

FIG. 8 is a diagram illustrating in more detail the process flow executed by the deformation component estimation unit 108 according to this embodiment in step S209.

Step S3100

In step S3100, if the number of feature areas $n_f$ is greater than or equal to three, the deformation component estimation unit 108 proceeds the process to step S3101. If the number of feature areas $n_f$ is not greater than or equal to three, the process is switched so as to proceed to step S3102.

Step S3101

Figure 9:
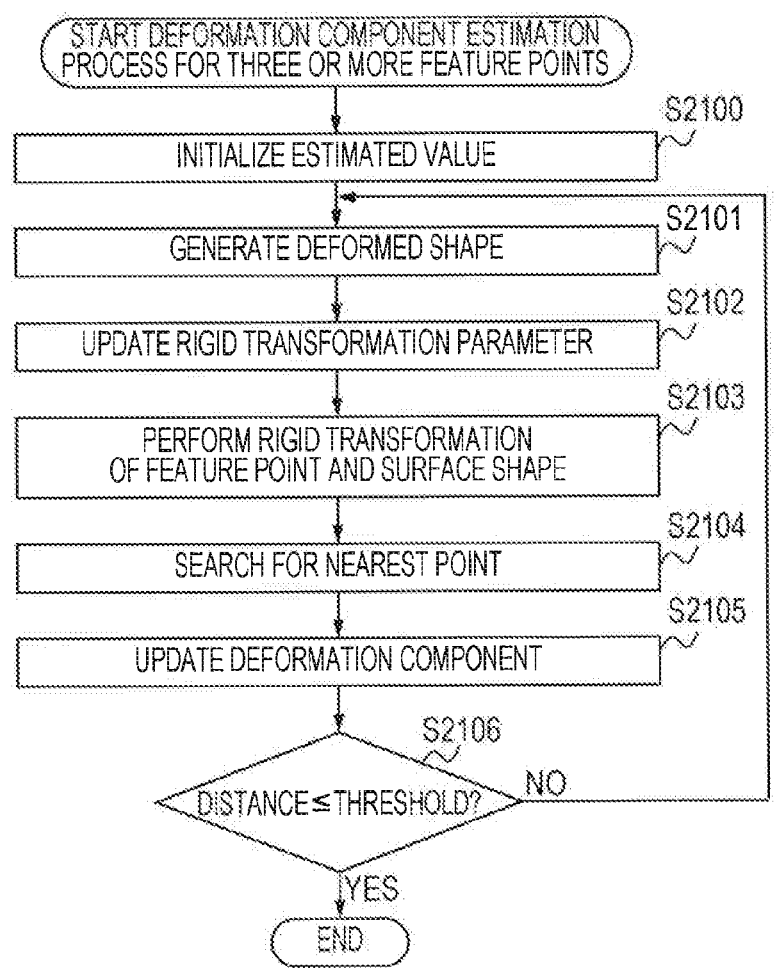
FIG. 9 is a flowchart illustrating the processing procedure of step S3101 according to the second embodiment.

In step S3101, the deformation component estimation unit 108 executes, as the process performed when the number of feature areas $n_2$ is greater than or equal to three, a process illustrated in flowchart of FIG. 9.

Steps S2100 to S2102

The processing of steps S2100 to S2102 is similar to the processing of steps S1100 to S1102 in the first embodiment, and will not be described herein.

Step S2103

In step S2103, the deformation component estimation unit 108 executes processing similar to the processing of step S1103 in the first embodiment on the basis of the estimated values R and t of the rigid transformation parameters obtained in step S2102 to calculate the position of the second feature area after rigid transformation. The deformation component estimation unit 108 further performs the rigid transformation using the equation below on the coordinates of each point representing the second surface shape obtained in step S207, and calculates coordinates $s_{2j\_rigid}$ ($1 \leq j \leq m_2$) of each point in the MRI coordinate system.

$$s_{2j\_rigid} = Rs_{2j} + t \qquad \text{[Math. 13]}$$

where $s_{2j}$ ($1 \leq j \leq m_2$) denotes the coordinates (that is, the coordinates in the range sensor coordinate system) of each point representing the second surface shape obtained in step S207, and $m_2$ denotes the total number of points.

Step S2104

In step S2104, the deformation component estimation unit 108 executes a process for associating points that are the closest to each of the surface nodes constituting the estimated deformed shape $s_{d\_est}$ from the point group $s_{2j\_rigid}$ ($1 \leq j \leq m_2$) obtained in the calculation of step S2103. However, each of the feature area nodes is associated with the position (that is, $v_{2j\_rigid}$ in Math. 11) of the second feature area after rigid transformation.

Step S2105

In step S2105, the deformation component estimation unit 108 executes a process for updating the deformation component estimated value $c_{est}$ so as to reduce the error evaluation value d between the points associated in S2104. In this case, the error evaluation value d may be implemented using, for example, an average Euclidean distance value between the associated points. Further, the distance between the feature area node and the corresponding point and the distance between the other surface nodes and the corresponding points may be assigned different weights, and the weighted average thereof may be used as the error evaluation value d. That is, a rating scale for increasing the penalty imposed on the feature area node that does not match the corresponding point may be used. Alternatively, the error evaluation value d may be calculated by taking into account, for example, the direction of normal to the outline surface of each shape. The process for updating the value $c_{est}$ can be executed by, similarly to the processing of step S1104 in the first embodiment, solving a generally known non-linear optimization problem, and will not be described in detail herein.

Step S2106

The processing of step S2106 is similar to the processing of step S1105 in the first embodiment, and will not be described herein.

As described above, the processing of step S3101 is executed.

Step S3102

In step S3102, if the number of feature areas $n_f$ is two, the deformation component estimation unit 108 proceeds the process to step S3103. Otherwise (if the number of feature areas $n_f$ is one), the process is switched so as to proceed to step S3104.

Step S3103

In step S3103, the deformation component estimation unit 108 performs the process performed when the number of feature areas $n_f$ is two. Specifically, the process illustrated in the flowchart of FIG. 9 is executed after the processing of step S2102 is changed as follows.

First, virtual rigid transformation that allows, at the position of the first feature area and the position of the second feature area, lines connecting two feature areas to match and allows the midpoint positions of the two feature areas to match is calculated. However, the rotational component about as the axis the line connecting the two feature area is still ambiguous. The determined virtual rigid transformation is hereinafter referred to as a three-row three-column rotational matrix R' and a three-dimensional translation vector t'.

Then, a rotational matrix R and a translation vector t are further corrected using R' and t' as the initial values. This correction may be executed using, for example, a well-known Iterative Closest Point (ICP) method. For example, processing similar to that of steps S2103 and S2104 is executed based on the current rigid transformation parameters, and the corresponding points of the surface nodes constituting the estimated deformed shape are determined among the point group $s_{2j\_rigid}$ ($1 \leq j \leq m_2$) obtained after rigid transformation. Then, the optimization of the rotational component about as the axis the line connecting the feature areas is executed so that the error evaluation value d between the corresponding points can be reduced as much as possible.

Step S3104

In step S3104, the deformation component estimation unit 108 performs the process performed when the number of feature areas $n_f$ is one. Specifically, the process illustrated in the flowchart of FIG. 9 is executed after the processing of step S2102 is changed as follows.

First, only the translation vector t' is determined so that the position of the first feature area and the position of the second feature area match each other, and a unit matrix is set as the rotational matrix R'. Then, a rotational matrix R and a translation vector t are further corrected using R' and t' as initial values. This correction may be executed using, for example, an Iterative Closest Point (ICP) method. For example, processing similar to that of steps S2103 and S2104 is executed based on the current rigid transformation parameters, and the corresponding points of the surface nodes constituting the estimated deformed shape $s_{d\_est}$ are determined among the point group $s_{2j\_rigid}$ ($1 \leq j \leq m_2$) obtained after rigid transformation. Then, the optimization of R and t is executed by determining the rotation whose origin is the position of the feature area that minimizes the error evaluation value d between the corresponding points.

According to the second embodiment of the present invention described above, processing is executed based not only on the position of a feature area but also on information regarding the surface shape of the object. Thus, in addition to the advantages of the first embodiment, advantageously, a higher accuracy estimation of the deformation can be achieved. In addition, advantageously, processing suitable for the number of feature areas can be executed by switching the processing in accordance with the number of feature areas obtained.

MODIFICATION EXAMPLE 2-1

In this embodiment, the processing of step S209 performed by the deformation component estimation unit 108 has been described in the context of the switching of processing in accordance with the number of feature areas obtained, by way of example. However, embodiments of the present invention are not limited to this example. For example, if the number of feature areas to be obtained is known in advance, the processing of step S209 may be replaced by the processing of step S3101, S3103, or S3104 illustrated in FIG. 8. In this method, advantageously, the present invention can be implemented with a simple configuration only having the function for executing processing suitable for a predetermined number of feature areas.

Third Embodiment

In the first and second embodiments, by way of example, only an area whose position is changed depending on the deformation condition is used as a feature area. In a third embodiment of the present invention, in contrast, one or more fixed areas (hereinafter referred to as "fixed feature area") whose position is not changed depending on the deformation condition may also be used as additional feature areas. This enables constraint of a rigid transformation component, and, advantageously, allows a higher reliability deformation estimation.

The functional configuration and overall process flow of an information processing apparatus according to this embodiment are similar to those in the second embodiment.

In this embodiment, the shape measurement apparatus 3 may be implemented by, for example, an ultrasound imaging apparatus or the like including an ultrasonic probe having a magnetic sensor or the like (not illustrated), and may be configured to measure the shape of the target object by measuring a position at which the ultrasonic probe and the target object (breast) are in contact. Further, an image of the chest wall surface 401 or the like may be captured as an ultrasound image, and the shape may be measured.

Steps S200 to S201

The processing of steps S200 and S201 is similar to that of the first embodiment, and will not be described herein.

Step S202

In step S202, the first feature point position obtaining unit 102 performs, in addition to the processing of first embodiment, a process for extracting a fixed feature area of the target object from the first three-dimensional image 403. The term "fixed feature area", as used herein, refers to a characteristic part in, for example, the chest wall surface 401, the sternum, the rib, the clavicle, or the like (not illustrated), and may correspond to, for example, the xiphoid process or the like. The position of the fixed feature area does not change depending on the difference between the first deformation condition and the second deformation condition.

Further, the first feature point position obtaining unit 102 adds the fixed feature area and position information regarding the fixed feature area (hereinafter referred to as a position of a first fixed feature area) to the first shape model as a fixed node. Here, $n_g$ denotes the number of fixed feature areas obtained in the above process. In this embodiment, one or more fixed feature areas are extracted, by way of example. That is, the case for $n_g \geq 1$ will be described.

Steps S203 and S205

The processing of steps S203 and S205 is similar to that of the first embodiment, and will not be described herein.

Step S207

In step S207, the second shape obtaining unit 106 obtains the position of the tip of the probe when the operator brings the ultrasonic probe into contact with a feature area on the surface of the object, as the "position of the second feature area" of the feature area on the surface of the object. The second shape obtaining unit 106 further obtains, as information for obtaining the position of the fixed feature area under the second deformation condition (hereinafter referred to as the position of the second fixed feature area), an ultrasound image group obtained by the operator by operating the ultrasonic probe in contact with the subject being examined, and the probe position obtained when each image is captured. Further, the set of probe tip positions obtained at this time is obtained as the surface shape (second surface shape) of the breast 400 under the second deformation condition.

Step S208

In step S208, the second feature point position obtaining unit 107 executes a process for obtaining the position of a second fixed feature area. Specifically, image processing is performed on the ultrasound image group obtained in step S207 to extract the area corresponding to the fixed feature area obtained in step S202. Then, the three-dimensional coordinates of the fixed feature area in the coordinate system (hereinafter referred to as a sensor coordinate system) used as a reference by the shape measurement apparatus 3 are calculated using the coordinates of the corresponding area on an ultrasound image and the probe position obtained when the ultrasound image was captured, and are set as the position of the second fixed feature area.

Step S209

Figure 10:
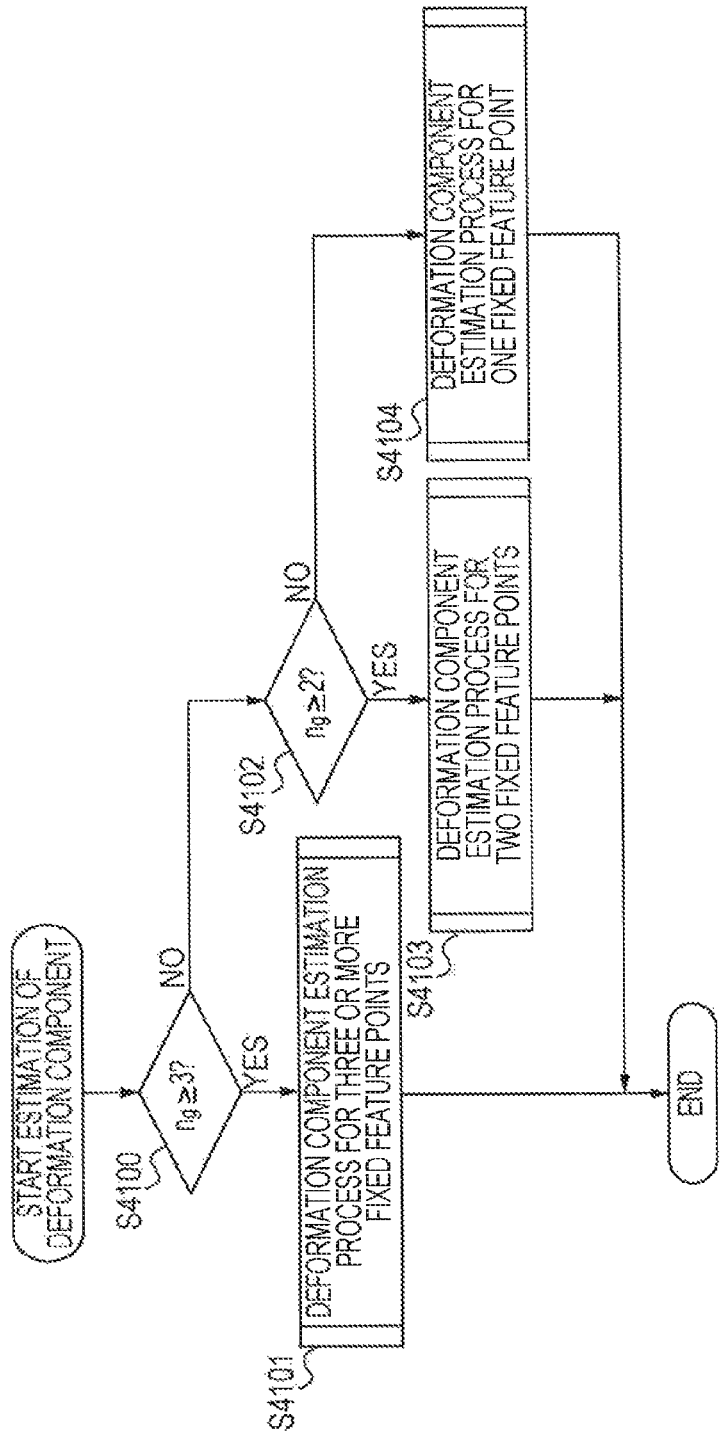
FIG. 10 is a flowchart illustrating the processing procedure of step S209 according to a third embodiment.

In step S209, the deformation component estimation unit 108 executes the process illustrated in a flowchart of FIG. 10 to determine a deformation component estimated value $c_{est}$. This process is executed in a different manner depending on the case where the number of fixed feature areas is three or more, two, or one. The processing of steps S4100 to S4104 will now be described in detail.

Step S4100

In step S4100, the deformation component estimation unit 108 executes a process for switching the subsequent processing in accordance with the number of fixed feature areas $n_g$. Here, the processing is switched so that the process proceeds to step S4101 if the number of fixed feature areas $n_g$ is greater than or equal to three and proceeds to step S4102 otherwise.

Step S4101

Figure 11:
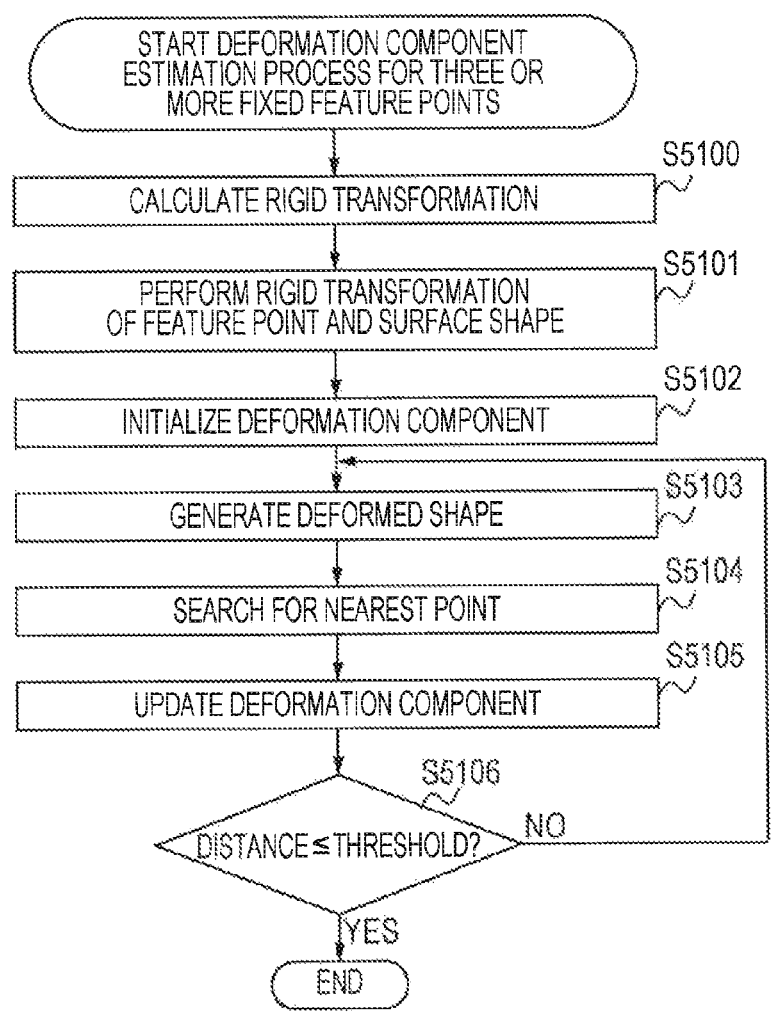
FIG. 11 is a flowchart illustrating the processing procedure of step S4101 according to the third embodiment.

In step S4101, the deformation component estimation unit 108 executes a deformation component estimation process performed when the number of fixed feature areas $n_g$ is greater than or equal to three. FIG. 11 is a diagram illustrating a flow of this process in detail. The process illustrated in FIG. 11 will now be described in detail.

Step S5100

In step S5100, the deformation component estimation unit 108 executes a process for determining the rigid transformation parameters R and t between the MRI coordinate system and the sensor coordinate system on the basis of the position of the first fixed feature area and the position of the second fixed feature area. The method for determining coordinate system conversion using a plurality of corresponding points is well known, and will not be described herein.

Step S5101

In step S5101, the deformation component estimation unit 108 executes processing similar to that of step S2103 in the second embodiment on the basis of the values R and t obtained in step S5100. As a result, the position of the second feature area after rigid transformation and the coordinates of each point representing a second surface shape in the MRI coordinate system are calculated.

Step S5102

In step S5102, the deformation component estimation unit 108 initializes the deformation component estimated value $c_{est}$. This initialization is executed by, for example, taking a zero vector for the value $c_{est}$.

Step S5103

In step S5103, the deformation component estimation unit 108 executes processing similar to that of step S2101 in the second embodiment to generate an estimated deformed shape $s_{d\_est}$ to obtain an estimated coordinate value of each surface node.

Step S5104

In step S5104, the deformation component estimation unit 108 executes processing similar to that of step S2104 in the second embodiment to obtain a corresponding point of each of the surface nodes constituting the estimated deformed shape $s_{d\_est}$.

Step S5105

In step S5105, the deformation component estimation unit 108 executes processing similar to that of step S2105 in the second embodiment to update the deformation component estimated value $c_{est}$.

Step S5106

In step S5106, the deformation component estimation unit 108 executes a termination determination similar to the processing of step S2106 in the second embodiment. Then, if a negative result is obtained in the termination determination of step S5106, the process returns to step S5103, and the process for updating the deformation component estimated value $c_{est}$ continues. That is, the processing of steps S5103 to S5106 is repeatedly performed until a positive result is obtained in the termination determination of step S5106.

With the above process, the deformation component estimation unit 108 executes the processing of step S4101.

Step S4102

In step S4102, the deformation component estimation unit 108 switches the process so as to proceed to step S4103 if the number of fixed feature areas $n_g$ is two, and to proceed to step S4104 otherwise (if the number of fixed feature areas $n_g$ is one).

Step S4103

Figure 12:
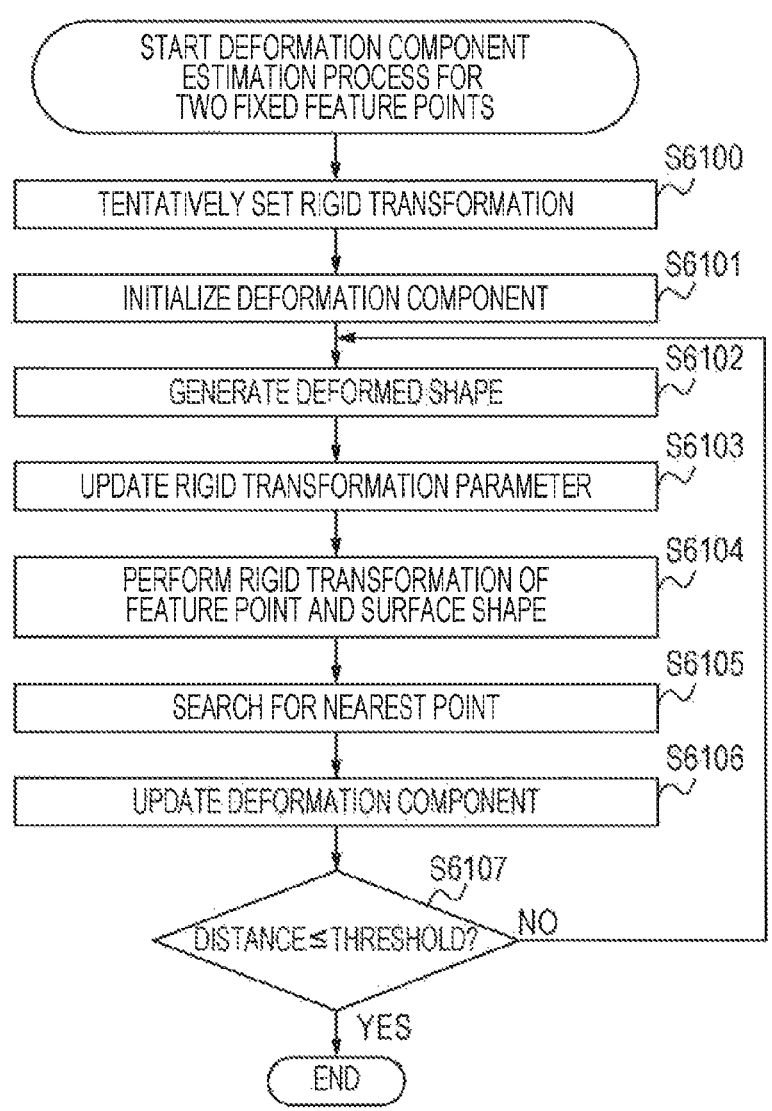
FIG. 12 is a flowchart illustrating the processing procedure of step S4103 according to the third embodiment.

In step S4103, the deformation component estimation unit 108 executes the deformation component estimation process performed when the number of fixed feature areas $n_g$ is two. FIG. 12 is a diagram illustrating a flow of this process in detail. The process illustrated in FIG. 12 will be described in detail.

Step S6100

In step S6100, the deformation component estimation unit 108 executes a process for tentatively setting the rigid transformation parameters R and t, on the basis of the position of the first fixed feature area and the position of the second fixed feature area, for making the positions of the fixed feature areas match. This process is a process executed when the number of fixed feature areas is two, and the rotational component about as the axis the line connecting the two feature areas is still ambiguous. Here, the component is set to a tentative value, and the processing after the subsequent step is executed to determine the final rigid transformation parameters.

Steps S6101 to S6102

In steps S6101 and S6102, the deformation component estimation unit 108 executes processing similar to the processing of steps S5102 and S5103.

Step S6103

In step S6103, the deformation component estimation unit 108 corrects each of the feature areas other than the fixed feature areas for the values R and t so that the estimated coordinate value of the feature area node obtained in step S6102 and the position of the corresponding second feature area most match. However, it is assumed that this correction is performed only on the rotational component about as the axis the line connecting the position of the first fixed feature area and the position of the second fixed feature area.

Step S6104

In step S6104, the deformation component estimation unit 108 executes processing similar to that of step S5101, and calculates the position of the second feature area and the coordinates of each point representing the second surface shape after rigid transformation on the basis of the values R and t obtained in step S6103.

Steps S6105 to S6107

In steps S6105 to S6107, the deformation component estimation unit 108 executes processing similar to that of steps S5104 to S5106. Then, if a negative result is obtained in the termination determination of step S6107, the process returns to step S6102, and the process for updating the deformation component estimated value $c_{est}$ continues. That is, the processing of steps S6102 to S6107 is iteratively executed until a positive result is obtained in the termination determination of step S6107.

With the process described above, the deformation component estimation unit 108 executes the processing of step S4103.

Step S4104

In step S4104, the deformation component estimation unit 108 executes the deformation component estimation process performed when the number of fixed feature areas $n_g$ is one. This process may be executed using processing similar to the processing of step S4103 after the processing of steps S6100 and S6103 is changed as follows. That is, in step S6100, the deformation component estimation unit 108 calculates, based on the position of the first fixed feature area and the position of the second fixed feature area, a translation vector t that allows the positions of the fixed feature areas to match. Further, a unit matrix is set as the initial value of the rotational matrix R. In step S6103, the deformation component estimation unit 108 corrects each of the feature areas other than the fixed feature areas for the values R and t so that the estimated coordinate value of the feature area node obtained in step S6102 and the position of the corresponding second feature area to most match. However, it is assumed that this correction is performed, under a condition of constraint where the positions of the fixed feature areas match, only on the rotational component having three degrees of freedom centered about the positions of the areas.

With the processing of steps S4100 to S4104 described above, the deformation component estimation unit 108 completes the calculation of the deformation component estimated value $c_{est}$, which is the processing of step S209.

Steps S210 to S212

The processing of steps S210 to S212 is similar to that in the first embodiment, and will not be described herein.

According to this embodiment, rigid transformation components can be constrained using a fixed feature area in the chest wall surface 401 or the like, and, advantageously, higher reliability deformation estimation can be achieved.

According to the present invention, therefore, a mechanism for high-accuracy and high-speed estimation of deformation even if the deformation parameters of the target object are unknown can be provided.

Other Embodiments

It is to be understood that the advantages of the present invention may also be achieved by supplying a recording medium (or a storage medium) on which a program code of software implementing the functions of the foregoing embodiments is recorded to a system or an apparatus and by reading and executing the program code stored in the recording medium by using a computer (or a CPU or a microprocessing unit (MPU)) of the system or the apparatus. In this case, the program code read from the recording medium implements the functions of the foregoing embodiments, and the recording medium on which the program code is recorded may constitute an embodiment of the present invention.

It is also to be understood that the foregoing embodiments may be implemented by executing the program code read by the computer, and the foregoing embodiments may be implemented by performing some of all the actual processes by an operating system (OS) or the like running on the computer in accordance with the instruction of the program code.

Furthermore, the functions of the foregoing embodiments may also be implemented by, after writing the program code read from the recording medium into a function expansion card inserted into the computer or into a memory included in a function expansion unit connected to the computer, performing some or all the actual processes by using a CPU or the like included in the function expansion card or function expansion unit in accordance with the instruction of the program code.

When the present invention is applied to the above recording medium, a program code corresponding to the flowcharts described previously is stored in the recording medium.

The descriptions of the foregoing embodiments are merely examples of an information processing apparatus according to exemplary embodiments of the present invention, and the present invention is not limited to the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-246667, filed Oct. 27, 2009, which is hereby incorporated by reference herein in its entirety.

The invention claimed is:

1. An information processing apparatus for executing a process for deforming a shape of an original image so as to approximate a shape of a target image or a target object, comprising:

a deformed-shape model generation unit configured to generate a deformed-shape model of the original image, based on a plurality of deformed shapes of the original image corresponding to a plurality of parameters and based on position information of a feature area of the original image associated with the deformed shapes, by using information regarding the shape of the original image obtained under a first deformation condition and using the position information of the feature area of the original image; and a deformation estimation unit configured to estimate deformation of the shape of the original image so as to approximate the shape of the original image to the shape of the target image or the target object based on the deformed-shape model using, as a condition of constrain, the position information about the feature area of the original image obtained under the first deformation condition and a corresponding feature area of the target image or the target object obtained under a second deformation condition.

2. An information processing apparatus for executing a process for deforming a shape of an original image so as to approximate a shape of a target image, comprising:

an obtaining unit configured to obtain a deformation rule by associating a movement of a feature area caused by deformation of the original image with the deformation; and a deformation unit configured to deform the original image in accordance with the deformation rule, using, as a condition of constraint, position information about a feature area of the target image and a corresponding area of the original image, wherein the obtaining unit includes a first shape obtaining unit configured to obtain information regarding a shape of the original image obtained under a first deformation condition, a second shape obtaining unit configured to obtain information regarding a shape of the target image obtained under a second deformation condition, a first feature point position obtaining unit configured to obtain position information about the feature area of the original image under the first deformation condition, a second feature point position obtaining unit configured to obtain position information about the feature area of the target image under the second deformation condition, and a deformed-shape model generation unit configured to generate a deformed-shape model of the original image from deformed shapes of the original image and position information about the feature area associated with the deformed shapes, and wherein the deformation unit includes a deformation estimation unit configured to estimate deformation of a shape of the original image under the second deformation condition to the shape of the target image, based on the deformed-shape model using, as a condition of constrain, the position information about the feature area of the original image under the first deformation condition and the position information about the feature area of the target image under the second deformation condition.

3. The information processing apparatus according to claim 2, wherein the second shape obtaining unit is configured to further obtain information regarding a portion of the shape of the target image, and wherein the deformation estimation unit estimates the deformation to the shape of the target image, further based on the information regarding the portion of the shape of the target image obtained by the second shape obtaining unit.

4. The information processing apparatus according to claim 2, further comprising:

an image obtaining unit configured to obtain an image, as the original image, by capturing an image of a target object under the first deformation condition; and a deformed image generation unit configured to deform the image obtained by the image obtaining unit based on the deformation estimated by the deformation estimation unit, wherein at least one of the first shape obtaining unit and the first feature point obtaining unit obtains predetermined information from the image obtained by the image obtaining unit.

5. The information processing apparatus according to claim 2, wherein the target object comprises a human breast, and a feature area of the target object includes at least a human nipple.

6. An information processing method for executing a process for deforming a shape of an original image so as to approximate a shape of a target image or a target object, comprising:

a deformed-shape model generation step of generating a deformed-shape model of the original image, based on a plurality of deformed shapes of the original image corresponding to a plurality of parameters and based on position information of a feature area of the original image associated with the deformed shapes, by using information regarding the shape of the original image obtained under a first deformation condition and using the position information of the feature area of the original image; and a deformation estimation step of estimating deformation of the shape of the original image so as to approximate the shape of the original image to the shape of the target image or the shape of the target object, based on the deformed-shape model using, as a condition of constrain, the position information about the feature area of the original image under the first deformation condition and a corresponding feature area of the target image or the target object obtained under a second deformation condition.

7. An information processing method for executing a process for deforming a shape of an original image so as to approximate a shape of a target image or a target object, comprising:

an obtaining step of obtaining position information about a plurality of areas into which the original image is divided;

a deformed-shape model generation step of generating a deformed-shape model of the original image, based on a plurality of deformed shapes of the original image corresponding to a plurality of parameters and based on position information of a feature area of the original image associated with the deformed shapes, by using information regarding the shape of the original obtained under a first deformation condition and using the position information of the feature area of the original image; and a deformation estimation step of estimating deformation of the shape of the original image so as to approximate the shape of the original image to the shape of the target image or the target object, based on the deformed-shape model using, as a condition of constrain, the position information about the feature area of the original image obtained under the first deformation condition and the position information about the plurality of areas into which the original image is divided.

8. A non-transitory computer-readable medium storing thereon a computer-executable program for causing a computer to execute the information processing method according to claim 6.

* * * * *